US012222562B2

(12) United States Patent
Ishii et al.

(10) Patent No.: US 12,222,562 B2
(45) Date of Patent: Feb. 11, 2025

(54) OPTICAL APPARATUS, LIGHT EMITTING APPARATUS, OPTICAL CABLE, AND METHOD OF CONNECTING OPTICAL APPARATUS

(71) Applicants: Sumitomo Electric Industries, Ltd., Osaka (JP); Sumitomo Electric Device Innovations, Inc., Yokohama (JP)

(72) Inventors: Kuniyuki Ishii, Yokohama (JP); Hiromi Kurashima, Osaka (JP); Hideaki Kamisugi, Yokohama (JP); Tomomi Sano, Osaka (JP); Tetsuya Nakanishi, Osaka (JP); Hong Chuyen Nguyen, Osaka (JP); Hajime Arao, Osaka (JP); Dai Sasaki, Osaka (JP); Takuro Watanabe, Osaka (JP)

(73) Assignees: Sumitomo Electric Industries, Ltd., Osaka (JP); Sumitomo Electric Device Innovations, Inc., Yokohama (JP)

( * ) Notice: Subject to any disclaimer, the term of this patent is extended or adjusted under 35 U.S.C. 154(b) by 0 days.

(21) Appl. No.: 17/600,337

(22) PCT Filed: Mar. 5, 2021

(86) PCT No.: PCT/JP2021/008835
§ 371 (c)(1),
(2) Date: Sep. 30, 2021

(87) PCT Pub. No.: WO2021/177463
PCT Pub. Date: Sep. 10, 2021

(65) Prior Publication Data
US 2024/0094481 A1 Mar. 21, 2024

(30) Foreign Application Priority Data
Mar. 5, 2020 (JP) ................................. 2020-037704

(51) Int. Cl.
*G02B 6/42* (2006.01)

(52) U.S. Cl.
CPC ............. *G02B 6/42* (2013.01); *G02B 6/4293* (2013.01)

(58) Field of Classification Search
CPC ................................ G02B 6/42; G02B 6/4293
See application file for complete search history.

(56) References Cited

U.S. PATENT DOCUMENTS

| 5,664,039 A | * | 9/1997 | Grinderslev | ......... G02B 6/3885 385/71 |
| 2003/0081386 A1 | * | 5/2003 | Robillard | ............... H05K 7/183 312/223.1 |

(Continued)

FOREIGN PATENT DOCUMENTS

| CN | 115407461 A | 11/2022 |
| JP | S61-157279 U | 9/1986 |

(Continued)

*Primary Examiner* — Michael P Mooney
(74) *Attorney, Agent, or Firm* — McCarter & English, LLP; Michael A. Sartori

(57) ABSTRACT

An optical apparatus includes a light emitting apparatus and a host apparatus. The light emitting apparatus includes a housing extending in a first direction, a light emitting device mounted in the housing, an optical connector including a first optical connection part provided at one end of the housing, and an electrical connector including a first electrical connection part provided at one end of the housing and receiving a voltage to drive the light emitting device. The host apparatus includes a host optical connector including a second optical connection part which faces the first optical connection part and is optically coupled thereto, a host electrical connector including a second electrical connection part facing the first electrical connection part and being electrically connected to the first electrical connection part, and a host board mounting the host optical connector and the (Continued)

host electrical connector thereon. The light emitting apparatus is connected to the host apparatus in the optical apparatus.

10 Claims, 15 Drawing Sheets

(56) References Cited

U.S. PATENT DOCUMENTS

| | | |
|---|---|---|
| 2005/0191013 A1 | 9/2005 | Sasaki et al. |
| 2011/0229090 A1 | 9/2011 | Isenhour et al. |
| 2013/0195396 A1* | 8/2013 | Julien ................ G02B 6/4293 385/71 |
| 2013/0251309 A1 | 9/2013 | Demerritt et al. |
| 2014/0099121 A1 | 4/2014 | Shiraishi et al. |
| 2022/0317384 A1 | 10/2022 | Qi et al. |

FOREIGN PATENT DOCUMENTS

| | | |
|---|---|---|
| JP | 2005-249892 A | 9/2005 |
| JP | 2005-536831 A | 12/2005 |
| JP | 2007-335366 A | 12/2007 |
| JP | 2013-522688 A | 6/2013 |
| JP | 2014-074869 A | 4/2014 |
| JP | 2015-508183 A | 3/2015 |
| JP | 2017-084529 A | 5/2017 |
| KR | 10-2016-0000347 A | 1/2016 |
| WO | 2014/157363 A1 | 10/2014 |
| WO | 2021/120702 A1 | 6/2021 |

* cited by examiner

OPTICAL APPARATUS, LIGHT EMITTING APPARATUS, OPTICAL CABLE, AND METHOD OF CONNECTING OPTICAL APPARATUS

TECHNICAL FIELD

The present disclosure relates to an optical apparatus, a light emitting apparatus, an optical cable, and a method of connecting the optical apparatus.

This application is based upon and claims the benefit of priority from Japanese Patent Application No. 2020-037704, filed on Mar. 5, 2020, the entire contents of which are incorporated herein by reference.

BACKGROUND ART

Patent Literature 1 discloses an optical module to input and output a voltage signal and an optical signal, which is a data link module. The optical module includes a printed board which is inserted into a housing and mounts a photoelectric conversion circuit or the like hereon, and an optical interface part and an electrical interface part which are connected to the printed board. The optical interface part is provided at one end of the housing in a longitudinal direction, and the electrical interface part is provided at the other end of the housing in the longitudinal direction.

CITATION LIST

Patent Literature

[Patent Literature 1] Japanese Unexamined Patent Publication No. 2005-249892

SUMMARY OF INVENTION

The present disclosure provides an optical apparatus. The optical apparatus includes a light emitting apparatus and a host apparatus. The light emitting apparatus includes a housing extending in a first direction, a light emitting device mounted in the housing, an optical connector including a first optical connection part provided at one end of the housing and is optically coupled to the light emitting device, and an electrical connector including a first electrical connection part which is provided at one end the housing and receives a voltage to drive the light emitting device. The host apparatus includes a host optical connector including a second optical connection part which faces the first optical connection part and is optically coupled to the first optical connection part when the light emitting apparatus is connected to the host apparatus, a host electrical connector including a second electrical connection part which faces the first electrical connection part in a state in which the first optical connection part and the second optical connection part face each other and is electrically connected to the first electrical connection part, and a host board which mounts the host optical connector and the host electrical connector thereon. The light emitting apparatus and the host apparatus are connected to each other.

The present disclosure provides a light emitting apparatus. The light emitting apparatus includes a housing extending in a first direction, a light emitting device mounted in the housing, an optical connector including a first optical connection part which is provided at one end of the housing and is optically coupled to an external optical path, and optically coupled to the light emitting device, and an electrical connector including a first electrical connection part which is provided at one end of the housing and receives a voltage to drive the light emitting device.

The present disclosure provides an optical cable. The optical cable includes an optical fiber extending in a first direction, a host optical connector that holds the optical fiber in the first direction, and a host electrical connector attached to the host optical connector. The host optical connector includes a second optical connection part which is provided at one end in the first direction and receives light transmitted to the optical fiber. The host electrical connector includes a second electric connection part which is provided near the one end and is electrically connected to an external electric wire, and a third electrical connection part electrically connected to another external electric wire in a second direction which is different from the first direction.

The present disclosure provides a method for connecting an optical apparatus. The method for connecting an optical apparatus is a method for connecting a light emitting apparatus to a host apparatus. The method includes (a) preparing a light emitting apparatus including a housing extending in a first direction, a light emitting device mounted in the housing, and an optical connector which includes a first optical connection part provided at one end of the housing and is optically coupled to the light emitting device, and an electrical connector which includes a flat plate-shaped first electrical connection part provided at one end of the housing and receives a voltage to drive the light emitting device, (b) preparing a host apparatus including a host optical connector having a second optical connection part which faces the first optical connection part, a host electrical connector having a concave second electrical connection part which faces the first electrical connection part and makes the first electrical connection part enter therein, and a host board on that mounts the host optical connector and the host electrical connector thereon, (c) inserting a plurality of guide pins provided on the host optical connector into a plurality of guide holes provided in the optical connector, (d) causing the first electrical connection part to enter the second electrical connection part, (e) optically coupling the first optical connection part to the second optical connection part, and (f) electrically connecting the first electrical connection part to the second electrical connection part.

DESCRIPTION OF EMBODIMENTS

Figure 1:
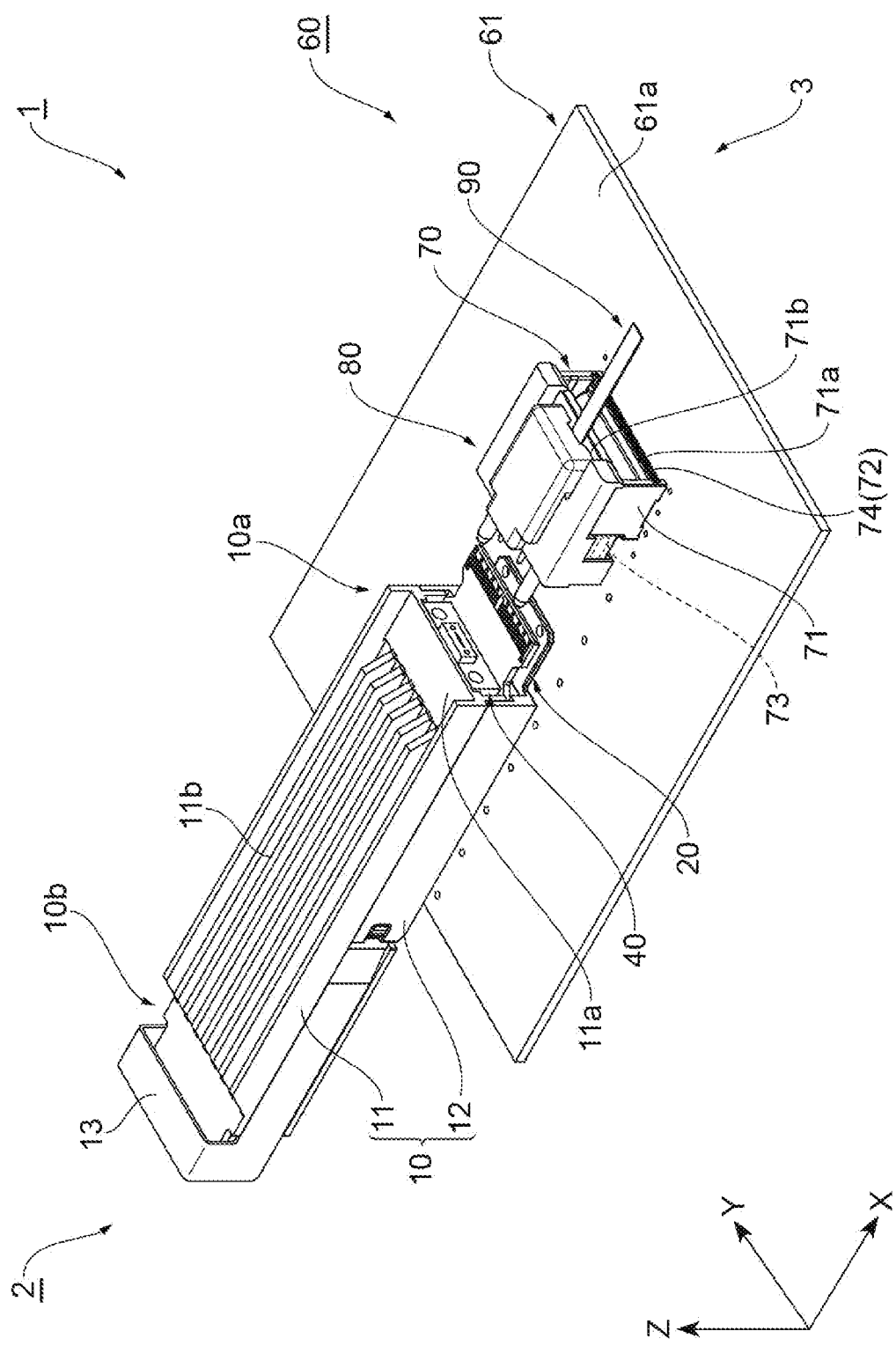
FIG. 1 is a perspective view showing an optical apparatus according to an embodiment.

Technical Problem to be Solved by Present Disclosure

An aspect using co-packaged optics (CPO) and an external light source (ELS) has been proposed as a new optical apparatus. The ELS has a function as a light source of the CPO. The ELS includes a light emitting element (e.g. a laser diode) and a transmission line (e.g. an optical fiber) which transmits light (e.g. a laser beam) output by the light emitting element. The ELS supplies a continuous wave (CW) to a plurality of channels of the CPO with one wavelength. The light emitting element used for ELS is required to obtain a high output, and for example, a light emitting element capable of obtaining an output of 23 dBm or more and 27 dBm or less is known.

In the optical module described in Patent Literature 1, an optical interface part and an electrical interface part are provided at different ends thereof from each other in a longitudinal direction. In such an apparatus, the light emitting element emits light by inputting a voltage to the electrical interface part. This light is transmitted to an external apparatus via the optical interface part. However, when an external apparatus (e.g. a power supply) is connected to the electrical interface part provided at one end in a state in which the transmission line is not connected to the optical interface part, the light output from the optical interface part leaks from the other end at which the optical interface part is provided. Since the optical interface part normally faces a worker, it becomes necessary to take measures to ensure safety against output light during connection work between apparatuses, and thus, for example, there are problems such as an increase in the number of components in the light emitting apparatus and an increase in the number of processes in the connection work.

The present disclosure provides an optical apparatus, a light emitting apparatus, an optical cable, and a method for connecting an optical apparatus which are capable of reducing measures for ensuring safety against output light during connection work between apparatuses used for optical communication.

Effect of Present Disclosure

According to the optical apparatus, the light emitting apparatus, the optical cable, and the method for connecting the optical apparatus according to one embodiment of the present disclosure, it is possible to reduce measures for ensuring safety against light transmitted during connection work between apparatuses used for optical communication.

EXPLANATION OF EMBODIMENTS OF PRESENT DISCLOSURE

First, the contents of embodiments of the present disclosure will be listed and described. The optical apparatus according to one embodiment includes a light emitting apparatus and a host apparatus. The light emitting apparatus includes a housing extending in a first direction, a light emitting device mounted in the housing, an optical connector which includes a first optical connection part provided at one end of the housing and is optically coupled to the light emitting device, and an electrical connector including a first electrical connection part which is provided at one end of the housing and receives a voltage to drive the light emitting device. The host apparatus includes a host optical connector including a second optical connection part which faces the first optical connection part and is optically coupled to the first optical connection part when the light emitting apparatus is connected to the host apparatus, a host electrical connector including a second electrical connection part which faces the first electrical connection part in a state in which the first optical connection part and the second optical connection part face each other and is electrically connected to the first electrical connection part, and a host board that mounts the host optical connector and the host electrical connector thereon. The light emitting apparatus and the host apparatus are connected to each other.

In this optical apparatus, the light emitting apparatus is provided with both a first optical connection part of the optical connector and a first electrical connection part of the electrical connector at one end of the housing. The light emitting apparatus and the host apparatus are connected in a state in which the first optical connection part faces a second optical connection part of the host optical connector, and the first electrical connection part faces the second electrical connection part of the host electrical connector at one end of the housing of the light emitting apparatus. Thus, both input of a voltage (e.g. a power supply voltage, a voltage signal, or the like) to the first electrical connection part and output of light from the first optical connection part are performed at one end of the housing. Since safety against the output light is improved at the other end of the housing which faces the worker, it is possible to reduce measures for ensuring the safety against the output light.

In the optical apparatus, the host optical connector may include a pair of first guide pins which position the host optical connector with respect to the optical connector when the light emitting apparatus and the host apparatus are connected, and a pair of second guide pins provided at positions at which the pair of first guide pins are sandwiched therebetween and positioning the host optical connector with respect to the optical connector when the light emitting apparatus and the host apparatus are connected. The outer diameter of the second guide pin may be larger than the outer diameter of the first guide pin. The length from the second optical connection part to the tip end of the second guide pin may be longer than the length from the second optical connection part to the tip end of the first guide pin. In this case, since the positioning is performed stepwise by the first guide pin and the second guide pin, operability related to the connection between the light emitting apparatus and the host apparatus can be improved.

In the above-described optical apparatus, the optical connector may include a first optical connection member including the first optical connection part and a first holding member which holds the first optical connection member. The host optical connector may include a second optical connection member including the second optical connection part and a second holding member which holds the second optical connection member. The second guide pins may be provided on the second holding member. The first guide pins may be provided on the second optical connection member. A pair of first guide holes into which the pair of first guide pins are inserted may be provided in the first optical connection member. A pair of second guide holes into which the pair of second guide pins are inserted may be provided in the first holding member at positions at which the pair of first guide holes are sandwiched therebetween. The inner diameter of the second guide hole may be larger than the inner diameter of the first guide hole. In this case, since the first optical connection member and the second optical connection member are positioned with each other and the first holding member and the second holding member are positioned with each other, alignment can be performed more precisely.

In the above optical apparatus, the first optical connection part may protrude from the first holding member in the first direction. The second optical connection part may protrude from the second holding member in the first direction. In this case, when the light emitting apparatus and the host apparatus are connected, a connection location between the first optical connection part and the second optical connection part is not covered with the first holding member and the second holding member and thereby, it is possible to improve visibility of the connection location between the first optical connection part and the second optical connection part.

In the above-described optical apparatus, the host optical connector may have an elastic body which exerts a force to the second optical connection member so that the second optical connection part protrudes further in the first direction than the second electrical connection part. The second holding member may hold the second optical connection member via the elastic body. The host electrical connector may be fixed to the second holding member. In this case, the second optical connection part is urged to protrude further in the first direction than the second electrical connection part, and thereby, the second optical connection part is connected to the first optical connection part before the second electrical connection part is connected to the first electrical connection part. Thus, an optical path from the first optical connection part to the second optical connection part is defined before electrical power is supplied to the light emitting device. Therefore, when a voltage is supplied to the first electrical connection part from the second electrical connection part and light is output from the light emitting device, the light is guided along the optical path defined first, and thus the safety against the light output from the first optical connection part is further improved.

In the optical apparatus, the host apparatus may further include a first optical fiber which is attached to the host optical connector and is optically coupled to the second optical connection part, and a wire which is connected to the second electrical connection part and is provided on the host board. The host electrical connector may be fixed to the host optical connector. Further, in the above-described optical apparatus, the light emitting apparatus may further include a plurality of second optical fibers which are optically coupled to the light emitting device and the first optical connection part. The first optical connection part may be configured of a plurality of optical coupling parts which are arranged in a second direction intersecting the first direction and are optically coupled to the plurality of second optical fibers, respectively.

In the above-described optical apparatus, the second optical connection member can be mounted on and removed from the host optical connector in the first direction.

In the above-described optical apparatus, the second optical connection member may be held by the elastic body with an urging force of 3N or more to protrude from the second electrical connection part in the first direction while it is inserted into the host optical connector. When the second optical connection member is removed from the host optical connector, at least the second optical connection member and the elastic body may be integrally removed. The elastic body may have a structure in which it can be mounted on and removed from the second optical connection member and a first optical fiber held by the second optical connection member in a state in which it is removed from the host optical connector.

The light emitting apparatus according to one embodiment includes a housing extending in a first direction, a light emitting device mounted in the housing, an optical connector which has a first optical connection part provided at one end of the housing and is optically coupled to the light emitting device, and an electrical connector having a first electrical connection part which is provided at one end of the housing and receives a voltage to drive the light emitting device.

According to the light emitting apparatus, since both an input of a voltage to the first electrical connection part and an output of light from the first optical connection part are performed at one end of the housing, it is possible to reduce measures for ensuring the safety against the output light at the other end.

The optical cable according to one embodiment includes an optical fiber extending in a first direction, a host optical connector which holds the optical fiber in the first direction, and a host electrical connector attached to the host optical connector. The host optical connector has a second optical connection part which is provided at one end in the first direction and receives light transmitted to the optical fiber. The host electrical connector includes a second electrical connection part which is provided in the vicinity of the one end and is electrically connected to an external electric wire, and a third electrical connection part which is electrically connected to another external electric wire in a second direction which is different from the first direction.

According to the optical cable, since an output of a voltage from the second electrical connection part and an input of light to the second optical connection part are performed in the vicinity of each other, it is suitable as a mating device connected to a device which performs both the input of the voltage and the output of the light at one common end.

The method for connecting an optical apparatus according to the embodiment is a connection method for connecting the light emitting apparatus to the host apparatus. The connection method includes (a) preparing a light emitting apparatus including a housing extending in a first direction, a light emitting device mounted in the housing, and an optical connector which includes a first optical connection part provided at one end of the housing and is optically coupled to the light emitting device, and an electrical connector which includes a flat plate-shaped first electrical connection part provided at one end of the housing and receives a voltage to drive the light emitting device, (b) preparing a host apparatus including a host optical connector having a second optical connection part which faces the first optical connection part, a host electrical connector having a concave second electrical connection part which faces the first electrical connection part and which the first electrical connection is able to enter, and a host board which mounts the host optical connector and the host electrical connector thereon, (c) inserting a plurality of guide pins provided on the host optical connector into a plurality of guide holes provided in the optical connector, (d) causing the first electrical connection part to enter the second electrical connection part, (e) optically coupling the first optical connection part to the second optical connection part, and (f) electrically connecting the first electrical connection part to the second electrical connection part.

According to the connection method, since both an electrical connection of the first electrical connection part to the second electrical connection part and an optical connection of the first optical connection part to the second optical connection part are performed at one end portion of the housing, it is possible to reduce the measures for ensuring the safety against the transmitted light.

DETAILS OF EMBODIMENTS OF PRESENT DISCLOSURE

Specific examples of the optical apparatus, the light emitting apparatus, the optical cable, and the method for connecting the optical apparatus according to the embodiment of the present disclosure will be described below with reference to the drawings. The present disclosure is not limited to these examples, but is shown by the scope of claims and is intended to include all modifications within the meaning and scope equivalent to the scope of claims. In the following description, the same elements or elements having the same functions may be designated by the same reference numerals, and duplicate description may be omitted. In the description, an XYZ orthogonal coordinate system shown in the drawings may be referred to.

[Optical Apparatus]

Figure 2:
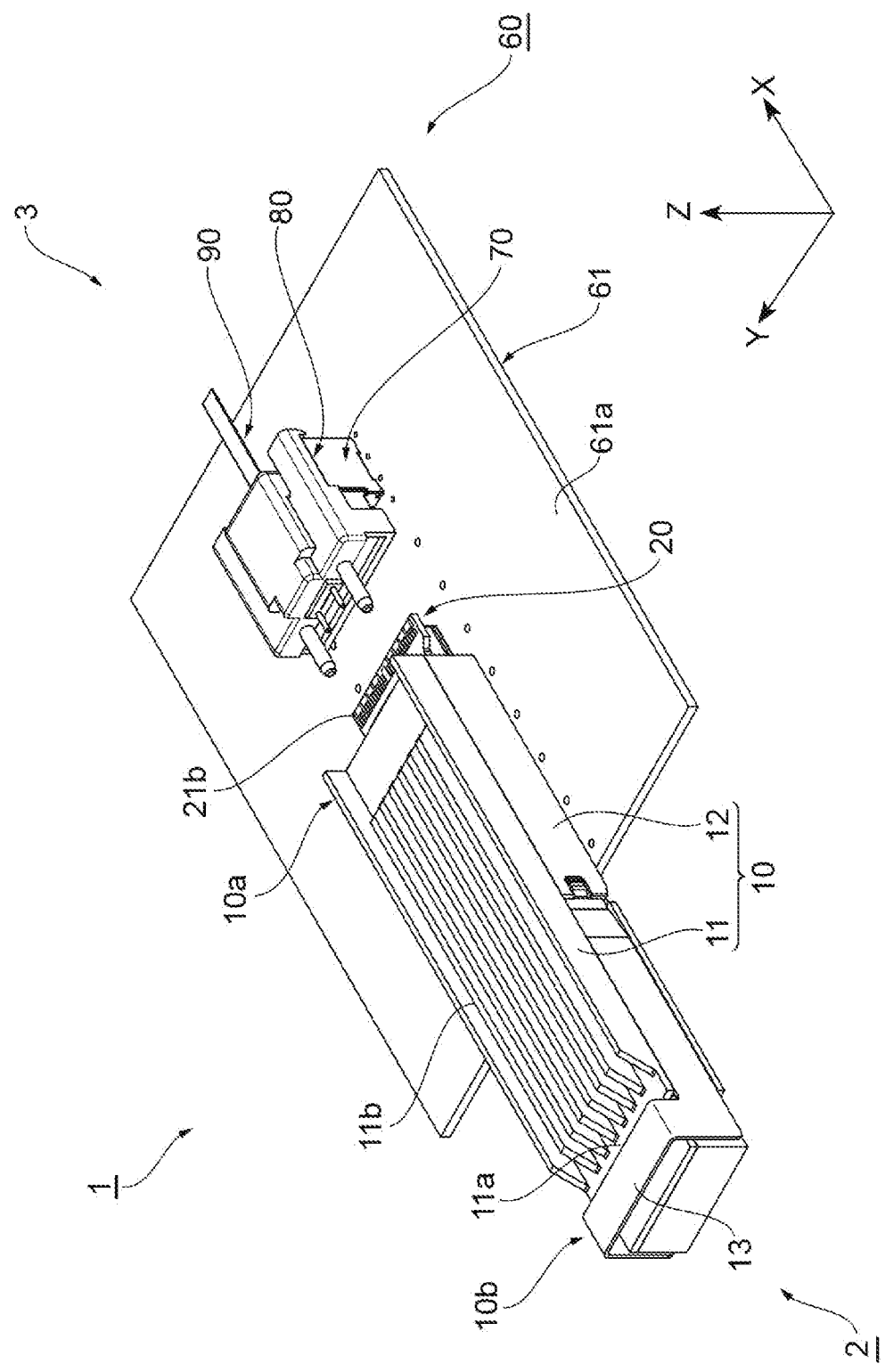
FIG. 2 is a perspective view showing the optical apparatus according to the embodiment.

FIGS. 1 and 2 are perspective views showing an optical apparatus 1 according to one embodiment. The optical apparatus 1 shown in FIGS. 1 and 2 includes a light emitting apparatus 2 and a host apparatus 3, and the light emitting apparatus 2 and the host apparatus 3 are connected to each other. The light emitting apparatus 2 is, for example, an external light source (ELS), and the host apparatus 3 is, for example, co-packaged optics (CPO). The light emitting apparatus 2 is inserted into and removed from the host apparatus 3 in the first direction. In this embodiment, an X-axis direction is the first direction.

[Light Emitting Apparatus]

Figure 3:
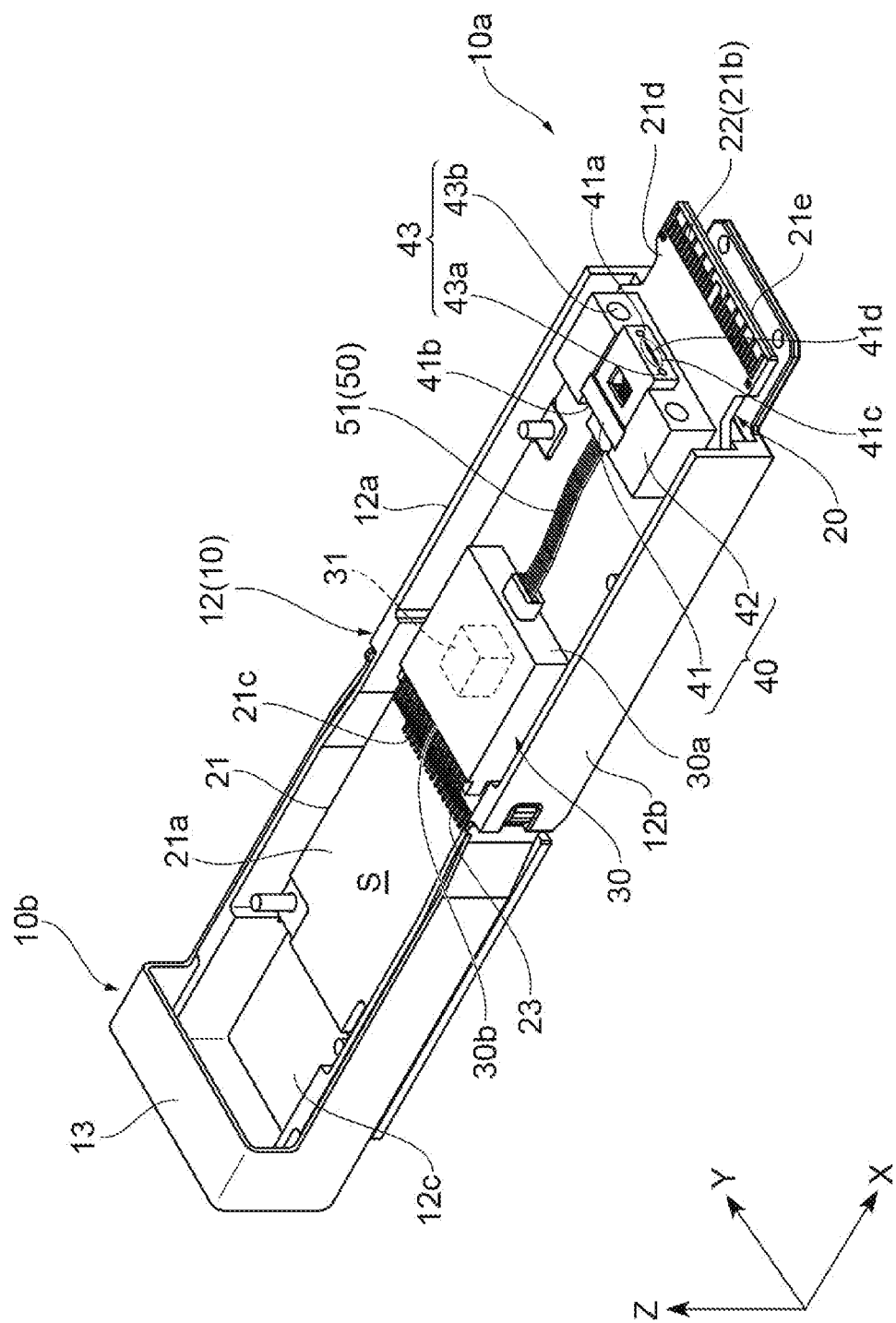
FIG. 3 is a perspective view showing an internal structure of an optical transceiver of FIGS. 1 and 2.

FIG. 3 is a perspective view showing an internal structure of the light emitting apparatus 2 of FIGS. 1 and 2. As shown in FIGS. 1 to 3, the light emitting apparatus 2 includes a housing 10, an electrical connector 20, a light emitting device 30, an optical connector 40, and an optical wire 50.

The housing 10 is a rectangular elongated metal member which extends in the X-axis direction. The housing 10 has an upper housing 11 and a lower housing 12. The lower housing 12 has a pair of side walls 12a and 12b which extend in the X-axis direction, and a bottom plate 12c. In the housing 10, an accommodation space S is defined by the side walls 12a and 12b and the bottom plate 12c. An optical transmission assembly configured of the light emitting device 30, the optical connector 40 and the optical wire 50 is mounted in the accommodation space S.

At one end 10a of the housing 10 in a longitudinal direction (i.e. in the X-axis direction), the bottom plate 12c protrudes to the outside of the accommodation space S. A substantially U-shaped pull tab 13 which extends to the other end 10b of the housing 10 is connected to the side walls 12a and 12b. An operator can easily insert and remove the light emitting apparatus 2 into/from the host apparatus 3 by gripping the pull tab 13 with fingers or the like and pushing and pulling the pull tab 13 in the X-axis direction.

The upper housing 11 has a flat plate 11a which covers the accommodation space S. A heat sink 11b is provided on a surface of the flat plate 11a opposite to the accommodation space S. The upper housing 11 serves as a heat radiating member by thermally connecting a surface of the flat plate 11a facing the accommodation space S to a transmitting device and radiating heat from the heat sink 11b to an external space.

The electrical connector 20 is configured of a printed circuit board assembly (PCBA) 21. The PCBA 21 is mounted on the bottom plate 12c of the housing 10. The PCBA 21 extends in the X-axis direction to cover the bottom plate 12c. A part of the PCBA 21 protrudes to the outside of the accommodation space S together with the bottom plate 12c at one end 10a of the housing 10.

The PCBA 21 has a dielectric substrate 21a, an electrical interface part 21b (a first electrical connection part), and a device connection part 21c. The electrical interface part 21b is configured of a plate-shaped portion of the PCBA 21 which protrudes to the outside of the accommodation space S, and includes a plurality of conductive patterns 22 provided on a main surface 21d of the dielectric substrate 21a at one end 10a. The conductive pattern 22 may also be provided on a back surface 21e of the dielectric substrate 21a at one end 10a. The electrical interface part 21b is electrically connected to the host apparatus 3 to receive a voltage for driving the light emitting device 30.

The device connection part 21c is configured of a plurality of conductive terminals 23 provided on the main surface 21d of the dielectric substrate 21a. The device connection part 21c is electrically connected to the light emitting device 30. The device connection part 21c inputs the voltage received by the electrical interface part 21b to the light emitting device 30.

The light emitting device 30 is mounted on the dielectric substrate 21a at a substantially central portion of the housing 10 in the X-axis direction. The light emitting device 30 is connected to the optical wire 50 at one end 30a thereof in the X-axis direction and is connected to the device connection part 21c at the other end 30b thereof in the X-axis direction. The one end 30a is an end located closer to the one end 10a of the housing 10, and the other end 30b is an end located closer to the other end 10b of the housing 10. The light emitting device 30 has a built-in light emitting element 31. The light emitting element 31 is, for example, a laser diode. The light emitting element 31 emits light due to the voltage input to the electrical interface part 21b. The light emitting device 30 transmits this light to an optical interface part 41c (which will be described later) of the optical connector 40 via the optical wire 50.

The optical connector 40 is mounted on the dielectric substrate 21a between the electrical interface part 21b and the light emitting device 30 in the X-axis direction. The optical connector 40 has a ferrule 41 (a first optical connection member), a holding member 42 (a first holding member), and a plurality of guide holes 43.

The ferrule 41 is a rectangular parallelepiped member which holds the optical wire 50. The ferrule 41 has a pair of end surfaces 41a and 41b orthogonal to the X-axis direction. The end surface 41a faces the electrical interface part 21b, and the end surface 41b faces the light emitting device 30. The ferrule 41 has an optical interface part 41c (a first optical connection part) on the end surface 41a. In other words, the optical interface part 41c is provided at the one end 10a of the housing 10. The optical interface part 41c is optically coupled to the host apparatus 3. The ferrule 41 holds a tip end of the optical wire 50, and the optical interface part 41c is optically coupled to the optical wire 50 and is also optically coupled to the light emitting device 30 via the optical wire 50.

In the present embodiment, the ferrule 41 is a mechanically transferable (MT) ferrule which holds an optical fiber group as the optical wire 50. The optical fiber group as the optical wire 50 has a plurality of (e.g. eight) optical fibers 51 (second optical fibers) which are arranged in a Y-axis direction and extend in the X-axis direction. The optical interface part 41c has a plurality of optical coupling parts 41d arranged in a row in the Y-axis direction. The number of the plurality of optical coupling parts 41d is the same as that of the optical fibers 51. The plurality of optical coupling parts 41d are optically coupled to the plurality of optical fibers 51, respectively. The plurality of optical coupling parts 41d may be tip end surfaces of the plurality of optical fibers 51 exposed on the end surface 41a.

The holding member 42 holds the ferrule 41. The holding member 42 has a rectangular parallelepiped exterior which has a size larger than the ferrule 41. The holding member 42 includes a bottom plate 42a joined to the dielectric substrate 21a, and a pair of side walls 42b which extend along the side walls 12a and 12b of the housing 10 on the bottom plate 42a. A holding groove 42d is formed to be defined in the holding member 42 by the bottom plate 42a and the pair of side walls 42b. A cross-sectional shape of the holding member 42 orthogonal to the X-axis direction is a substantially U shape. The ferrule 41 is held in the holding groove 42d so that the end surface 41a of the ferrule 41 protrudes toward the electrical interface part 21b in the X-axis direction with respect to the holding member 42.

The plurality of guide holes 43 are provided for positioning the light emitting apparatus 2 and the host apparatus 3 when the light emitting apparatus 2 and the host apparatus 3 are connected. A plurality of guide pins 83 (which will be described later) are respectively inserted into the plurality of guide holes 43. The plurality of guide holes 43 are arranged in a row in the Y-axis direction. The plurality of guide holes 43 include a pair of guide holes 43a (first guide holes) and a pair of guide holes 43b (second guide holes).

The guide hole 43b has an inner diameter larger than an inner diameter of the guide hole 43a. The pair of guide holes 43a extend in the X-axis direction at positions at which they sandwich the optical interface part 41c in the Y-axis direction. The pair of guide holes 43a are provided in the ferrule 41 and open to the end surface 41a. The pair of guide holes 43b extend alongside the pair of guide holes 43a at positions at which they sandwich the pair of guide holes 43a in the Y-axis direction. The pair of guide holes 43b are provided in each of the side walls 42b of the holding member 42 to pass through each of the side walls 42b in the X-axis direction.

[Host Apparatus]

As shown in FIGS. 1 and 2, the host apparatus 3 includes an optical cable 60 and a printed circuit board assembly 61 (a host board). The PCBA 61 has a mounting surface 61a which extends in the X-axis direction and the Y-axis direction. An optical cable 60 is mounted on the mounting surface 61a together with a plurality of electronic components (not shown).

The optical cable 60 includes an electrical connector 70 (a host electrical connector), an optical connector 80 (a host optical connector), and an optical wire 90 which extends in the X-axis direction. The electrical connector 70 is a mating connector to which the electrical connector 20 of the light emitting apparatus 2 is connected, and the optical connector 80 is a mating connector to which the optical connector 40 of the light emitting apparatus 2 is connected.

Figure 4:
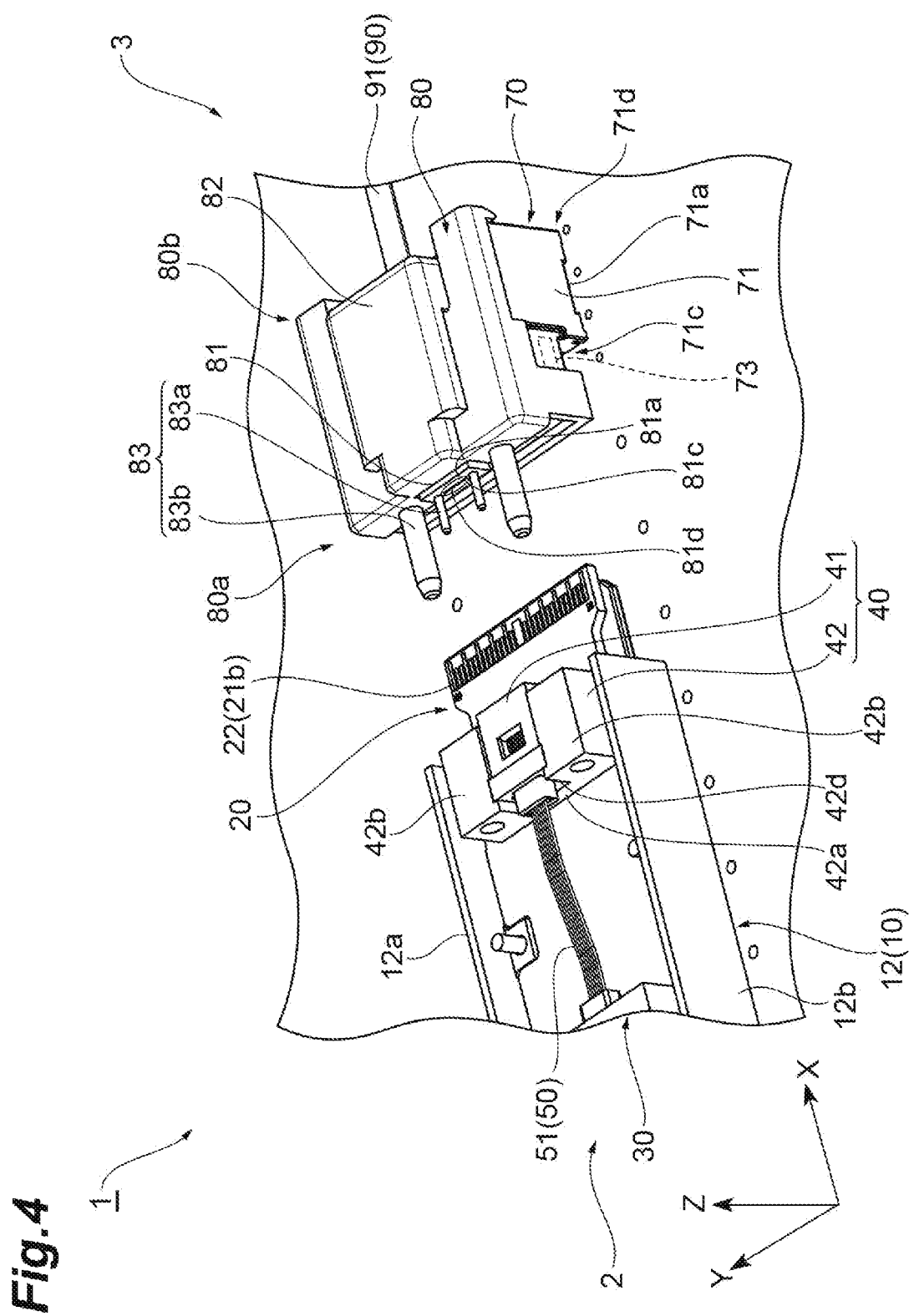
FIG. 4 is an enlarged perspective view showing a part of the optical apparatus.

FIG. 4 is an enlarged perspective view showing a part of the optical apparatus. The electrical connector 70 is joined to the PCBA 61. The electrical connector 70 has a base part 71, a board connection part 72 (refer to FIG. 5), and an electrical interface part 73 (a second electrical connection part). The base part 71 has a bottom surface 71a which faces the mounting surface 61a of the PCBA 61, and a top surface 71b (refer to FIG. 5) opposite to the bottom surface 71a. The board connection part 72 (a third electrical connection part) is configured of a plurality of conductive terminals 74 provided on the bottom surface 71a. The board connection part 72 is electrically connected to electric wiring (not shown) of the PCBA 61 in a second direction (a Z-axis direction in the present embodiment) different from the X-axis direction.

The electrical interface part 73 is provided at one end 71c of the base part 71 in the X-axis direction. The electrical interface part 73 is configured of a concave portion recessed toward the other end 71d of the base part 71 in the X-axis direction, and includes a plurality of conductive terminals 75 (refer to FIG. 8) arranged in the Y-axis direction. The electrical interface part 21b of the light emitting apparatus 2 can enter the electrical interface part 73. The plurality of conductive terminals 75 of the electrical interface part 73 come into contact with the plurality of conductive patterns 22 of the electrical interface part 21b in a state in which the electrical interface part 21b has entered an inner side of the electrical interface part 73.

The optical connector 80 is mounted on the electrical connector 70. The optical connector 80 includes a ferrule 81 (a second optical connection member), a cover member 82 (a second holding member), and the plurality of guide pins 83.

The ferrule 81 is a rectangular parallelepiped member which holds the optical wire 90. The ferrule 81 has a pair of end surfaces 81a and 81b (refer to FIG. 7) which are orthogonal to the X-axis direction. The end surface 81a faces the same direction as one end 71c of the electrical connector 70, and the end surface 81b faces the same direction as the other end 71d of the electrical connector 70. The end surface 81a is exposed at one end 80a of the optical connector 80 in the X-axis direction. The ferrule 81 has an optical interface part 81c (a second optical connection part) on the end surface 81a. In other words, the optical interface part 81c is provided at one end 80a of the optical connector 80. The electrical interface part 73 is also provided in the vicinity of the one end 80a. The optical interface part 81c is optically coupled to the optical interface part 41c in the light emitting apparatus 2. The ferrule 81 holds a tip end of the optical wire 90, and the optical interface part 81c is optically coupled to the optical wire 90.

In the present embodiment, the ferrule 81 is an MT ferrule which holds an optical fiber group as the optical wire 90. The optical fiber group as the optical wire 90 has a plurality of (8 in the present embodiment) optical fibers 91 (first optical fibers) which are arranged in the Y-axis direction and extend in the X-axis direction. The optical interface part 81c has a plurality of optical coupling parts 81d arranged in a row in the Y-axis direction. The number of the plurality of optical coupling parts 81d is the same as that of the optical fibers 91. The plurality of optical coupling parts 81d are optically coupled to the plurality of optical fibers 91, respectively. The plurality of optical coupling parts 81d may be tip end surfaces of the plurality of optical fibers 91 exposed to the end surface 81a.

The cover member 82 covers a part of the ferrule 81 and the electrical connector 70. The remaining portion of the ferrule 81 protrudes with respect to the cover member 82 in the X-axis direction at the one end 80a of the optical connector 80. The cover member 82 is joined to the top surface 71b of the base part 71 of the electrical connector 70. In other words, the cover member 82 is fixed to the electrical connector 70. Further, the ferrule 81 is held by the cover member 82 so that the optical interface part 81c can move relative to the electrical interface part 73 in the X-axis direction.

Specifically, the optical connector 80 further has an elastic body 84 (refer to FIG. 7) accommodated inside the cover member 82, and the cover member 82 holds the ferrule 81 via the elastic body 84. The elastic body 84 is, for example, a pressed spring member (compression coil spring in this embodiment). The elastic body 84 is joined to the end surface 81b of the ferrule 81. The elastic body 84 urges the ferrule 81 toward the ferrule 41 when the light emitting apparatus 2 and the host apparatus 3 are connected to each other. Thus, a physical contact (PC) load between ferrules 41 and 81 is ensured. The elastic body 84 applies an urging force to the ferrule 81 so that the optical interface part 81c protrudes in the X-axis direction with respect to the electrical interface part 73 at one end 80a of the optical connector 80. In a state in which the ferrule 81 is inserted into the optical connector 80, the ferrule 81 may be subjected to, for example, an urging force of 3N or more by the elastic body 84 to protrude with respect to the electrical interface part 73 in the X direction.

The plurality of guide pins 83 are provided for positioning the light emitting apparatus 2 and the host apparatus 3 when the light emitting apparatus 2 and the host apparatus 3 are connected. The plurality of guide pins 83 are arranged in a row in the Y-axis direction corresponding to the plurality of guide holes 43. The plurality of guide pins 83 include a pair of guide pins 83a (first guide pins) and a pair of guide pins 83b (second guide pins). The guide pin 83b has an outer diameter larger than an outer diameter of the guide pin 83a. Further, a length L1 from the optical interface part 81c to a tip end of the guide pin 83b is larger than a length L2 from the optical interface part 81c to a tip end of the guide pin 83a (refer to FIG. 5).

As shown in FIG. 4, the pair of guide pins 83a are inserted into the guide holes 43a when the light emitting apparatus 2 and the host apparatus 3 are connected. The pair of guide pins 83a extend in the X-axis direction at positions at which they sandwich the optical interface part 81c in the Y-axis direction. The pair of guide pins 83a are provided on the end surface 81a of the ferrule 81. The pair of guide pins 83b are inserted into the guide holes 43b when the light emitting apparatus 2 and the host apparatus 3 are connected. The pair of guide pins 83b extend alongside the pair of guide pins 83a at positions at which they sandwich the pair of guide pins 83a in the Y-axis direction. The pair of guide pins 83b are provided on the cover member 82.

In the optical connector 80, the ferrule 81 which holds the optical wire 90 configured of the optical fibers 91 is a separate member from the cover member 82 and can be mounted on and removed from the optical connector 80. In this case, when the ferrule 81 is removed from the optical connector 80, the ferrule 81 can be removed integrally with the elastic body 84. When the ferrule 81 is removed, the elastic body 84 may be detachable from the ferrule 81 and the optical wire 90. When the optical interface part 81c of the ferrule 81 or the optical wire 90 is damaged, the ferrule 81 which holds the optical wire 90 can be easily replaced by having such a removable structure. Although the elastic body 84 may have a structure such as an elastic resin having a half-split structure or a leaf spring structure in this case, the structure is not particularly limited as long as it has a structure capable of applying an urging force (for example, 3N or more) in a state in which it is mounted on the optical connector 80. When the elastic body 84 has a general-purpose spring structure, the optical wire 90 in which the optical fibers 91 pass through the elastic body 84 in advance and the optical connection members such as connectors are mounted on both ends is used, but in this case, it is necessary to prepare replacement members for a damaged optical interface part 81c or the optical wire 90 on which the elastic body 84 is mounted in advance. On the other hand, it is not necessary to prepare the replacement members on which the elastic body 84 is mounted in advance, and the elastic body 84 can be used repeatedly by making the elastic body 84 removable from the optical fiber 91 or the like.

[Method for Connecting Optical Apparatus]

Next, with reference to FIGS. 5 to 10, a method for connecting the optical apparatus 1 which connects the light emitting apparatus 2 and the host apparatus 3 to each other will be described. The connection between the light emitting apparatus 2 and the host apparatus 3 is performed by inserting the light emitting apparatus 2 into the host apparatus 3.

Figure 5:
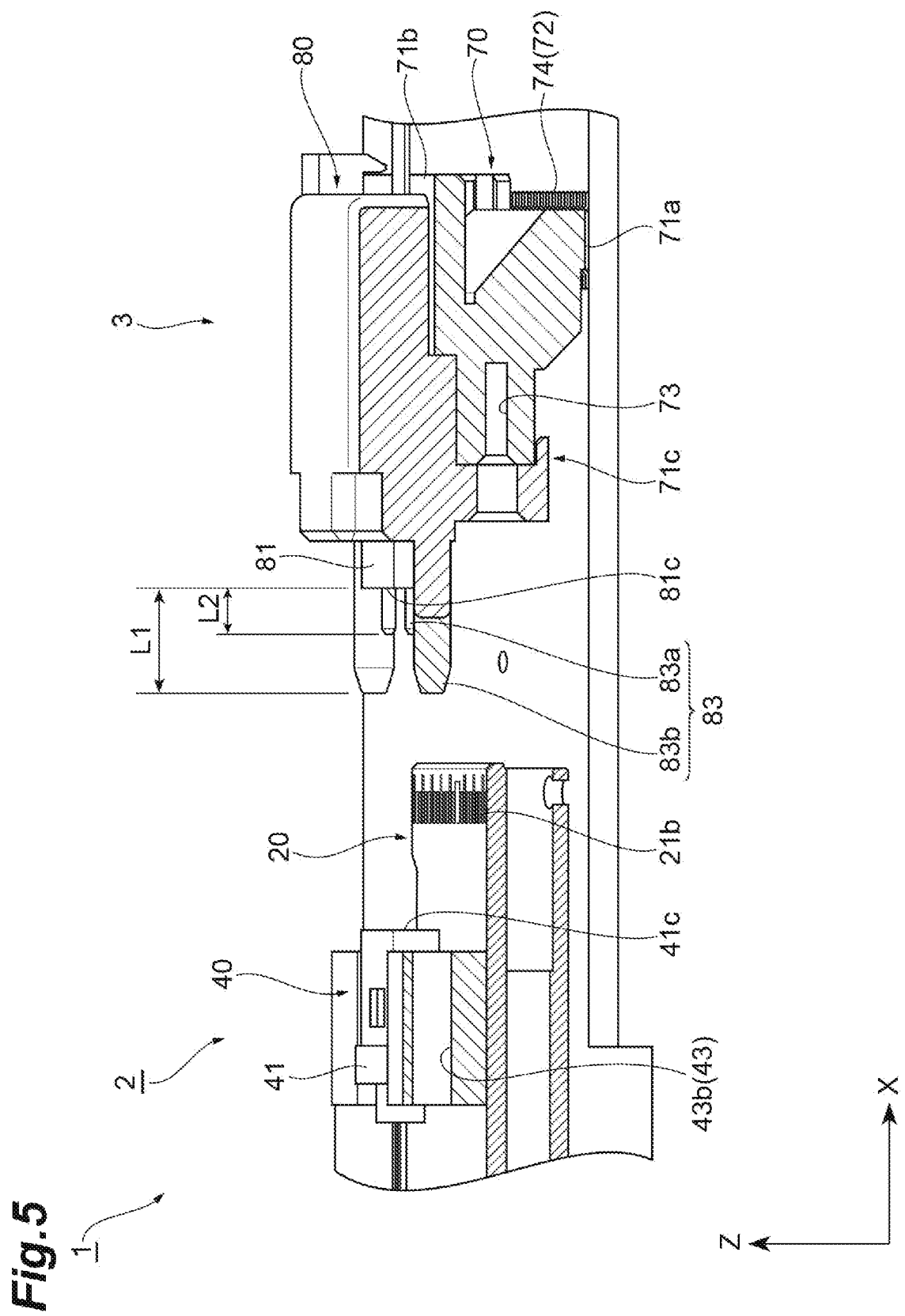
FIG. 5 is a perspective view showing a first step in a method for connecting the optical apparatus.

FIG. 5 is a perspective view showing a first step in the method for connecting the optical apparatus 1. In the first step, the above-described light emitting apparatus 2 and host apparatus 3 are prepared. Specifically, the light emitting apparatus 2 is placed on the PCBA 61 so that the optical interface part 41c in the light emitting apparatus 2 faces the optical interface part 81c in the host apparatus 3 in the X-axis direction. That is, the optical interface part 81c faces the optical interface part 41c when the light emitting apparatus 2 and the host apparatus 3 are connected to each other. In this state, the electrical interface part 21b of the light emitting apparatus 2 also faces the electrical interface part 73 of the host apparatus 3 in the X-axis direction.

Figure 6:
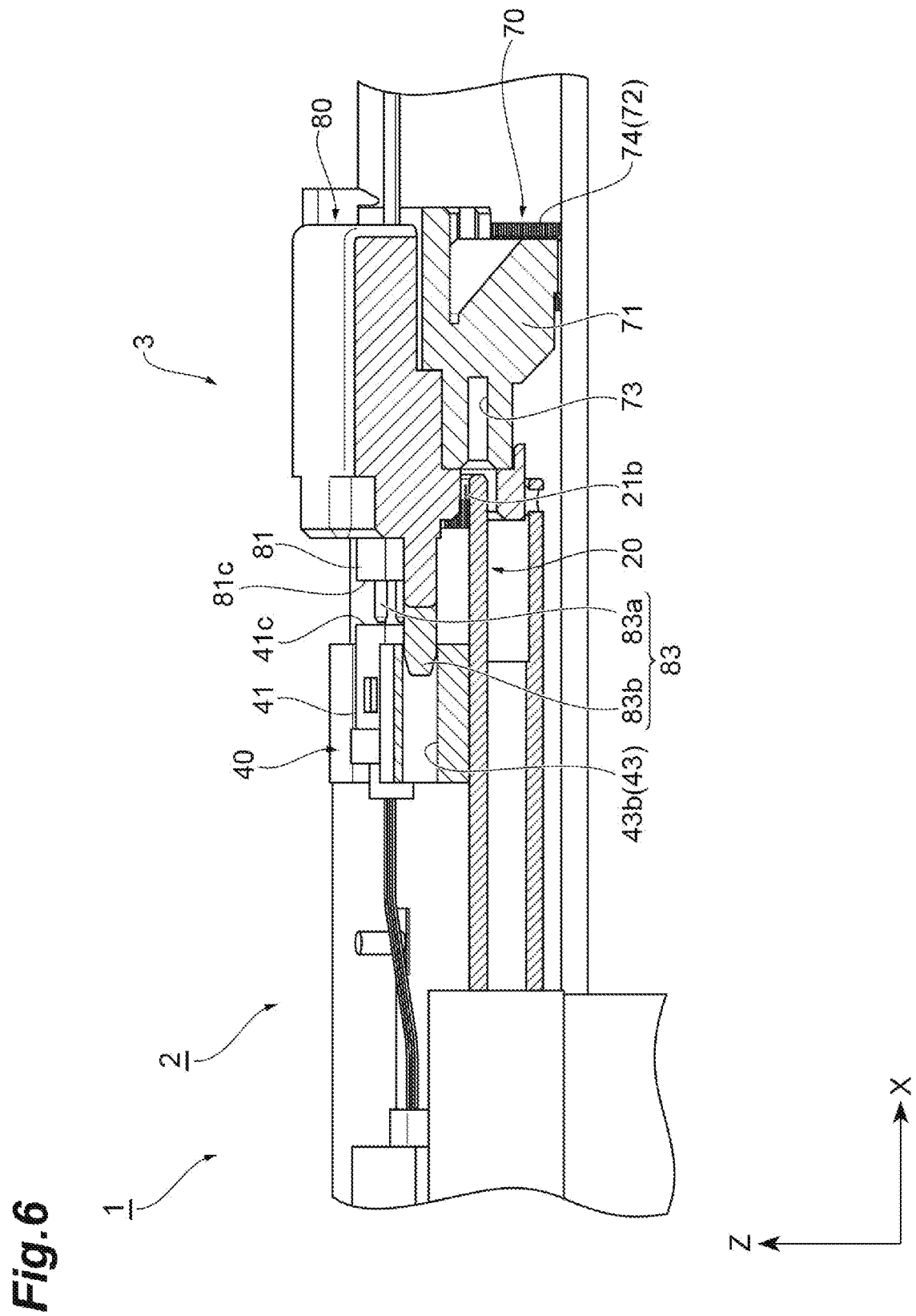
FIG. 6 is a perspective view showing a second step in the method for connecting the optical apparatus.

FIG. 6 is a perspective view showing a second step in the method for connecting the optical apparatus 1. In the second step, the light emitting apparatus 2 is moved in the X-axis direction in a direction in which the optical interface part 41c is brought closer to the optical interface part 81c, and the plurality of guide pins 83 provided at the optical connector 80 are inserted into the plurality of guide holes 43 provided in the optical connector 40, respectively. More specifically, first, the pair of guide pins 83b are inserted into the guide holes 43b, respectively, then, the light emitting apparatus 2 is further moved in the X-axis direction according to guidance of the pair of guide pins 83b, and the pair of guide pins 83a are inserted into the guide holes 43a.

Figure 7:
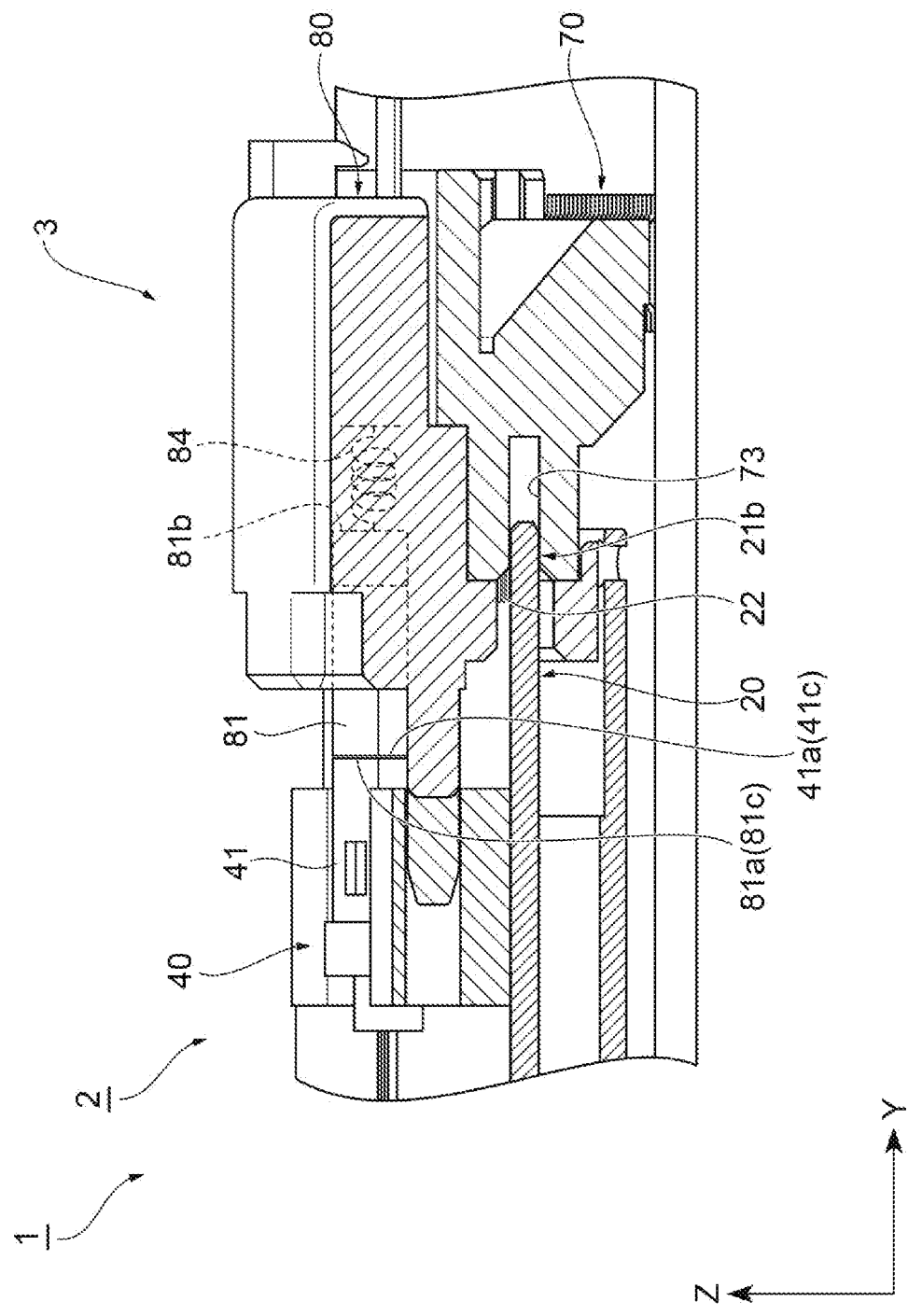
FIG. 7 is a perspective view showing a third step and a fourth step in the method for connecting the optical apparatus.
Figure 8:
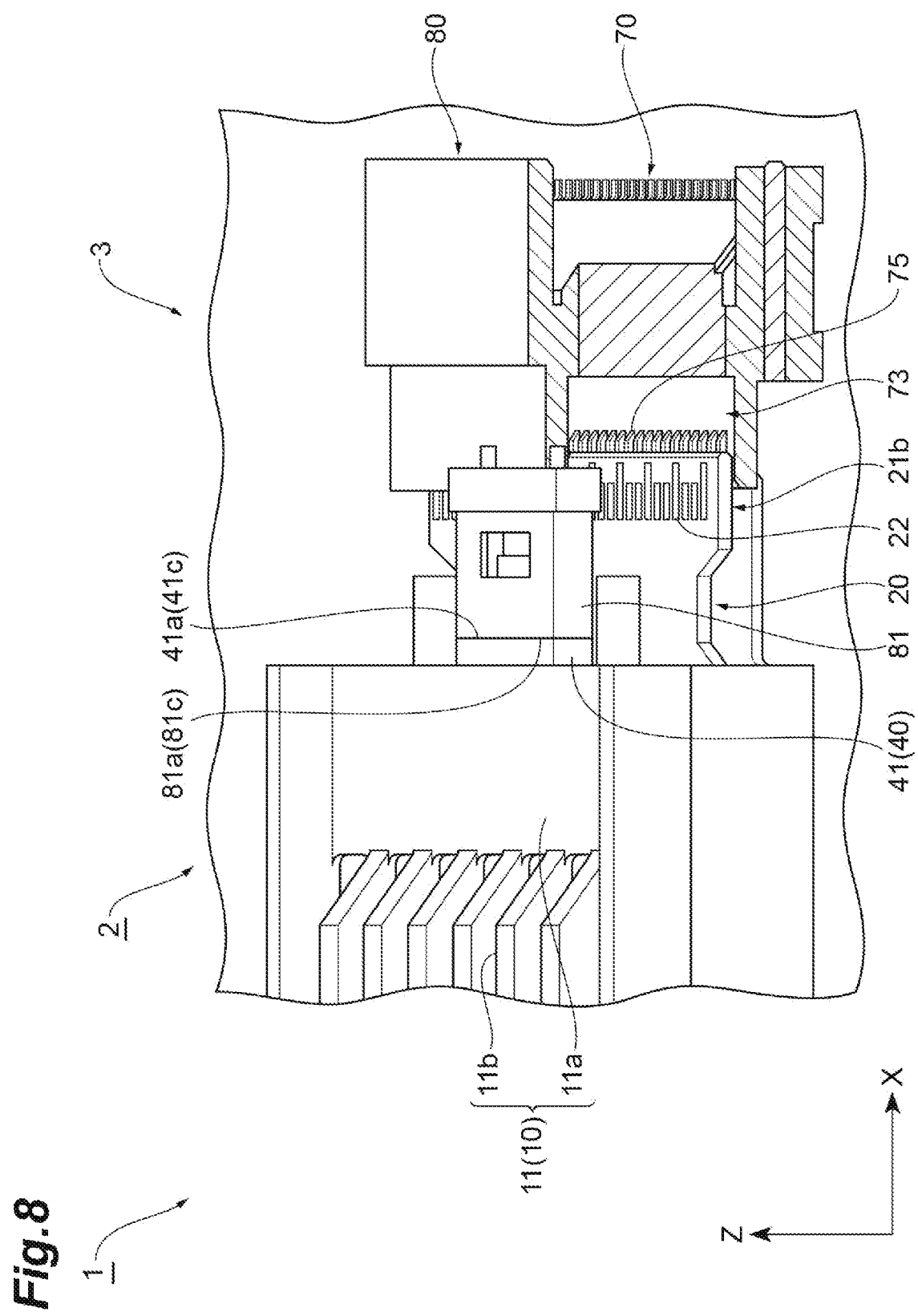
FIG. 8 is a perspective view showing the third step and the fourth step in the method for connecting the optical apparatus.

FIGS. 7 and 8 are perspective views showing a third step and a fourth step in the method for connecting the optical apparatus 1. FIG. 8 shows a structure in which a part of the host apparatus 3 is cut out. In the third step, the light emitting apparatus 2 is further moved in the X-axis direction, and the tip end of the electrical interface part 21b enters the electrical interface part 73.

In the fourth step, the electrical interface part 21b further enters the electrical interface part 73, and the end surface 41a of the ferrule 41 and the end surface 81a of the ferrule 81 are brought into contact with each other. Thus, the optical interface part 41c and the optical interface part 81c are optically coupled. More specifically, the plurality of optical coupling parts 41*d* (for example, the tip end surfaces of the plurality of optical fibers 51 exposed at the end surface 41*a*) and the plurality of optical coupling parts 81*d* (for example, the tip end surfaces of the plurality of optical fibers 91 exposed at the end surface 81*a*) are physically brought into contact with each other. In the fourth step, since the conductive pattern 22 and the conductive terminal 75 are not in contact with each other, the electrical interface part 21*b* and the electrical interface part 73 are not electrically connected.

Figure 9:
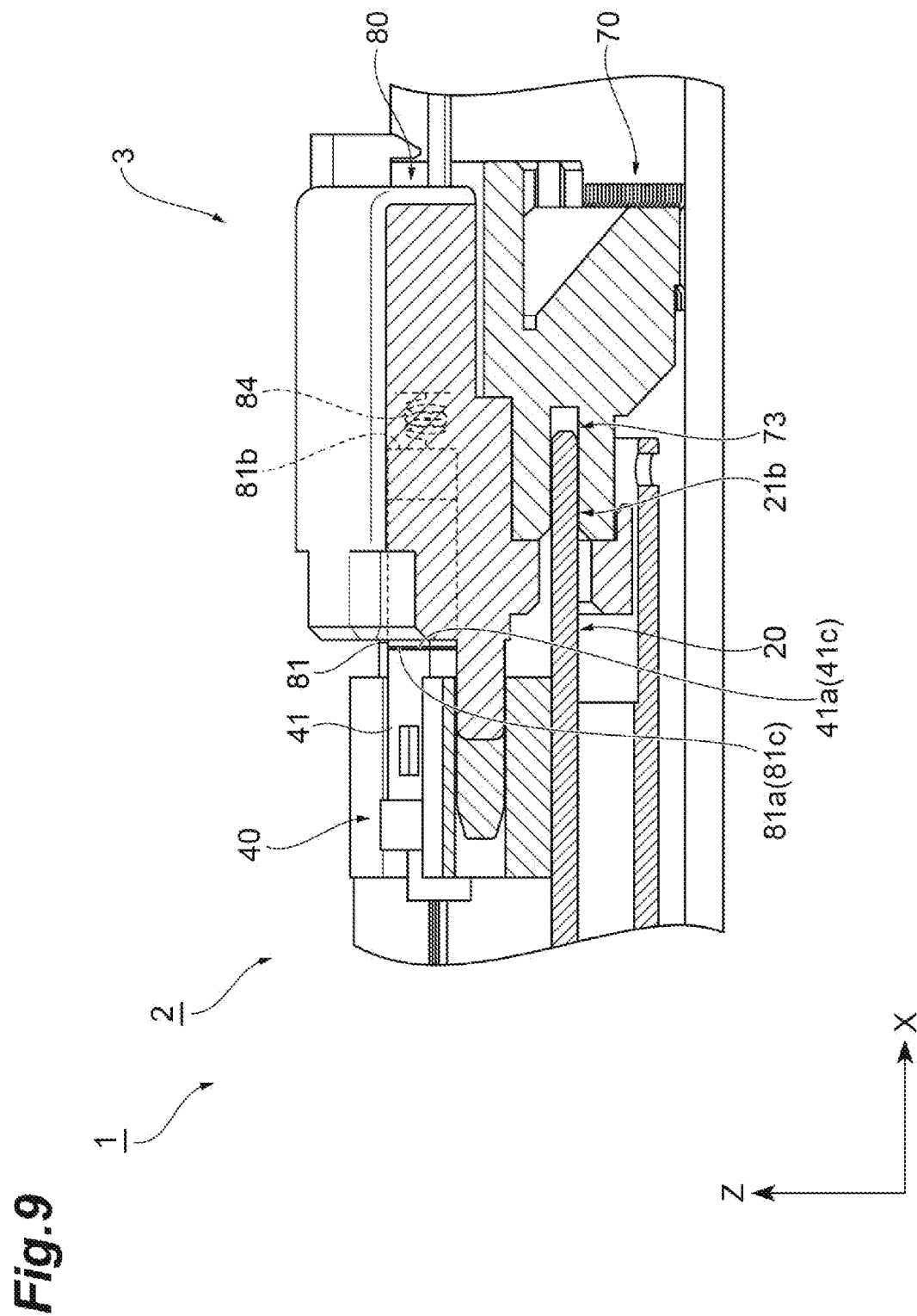
FIG. 9 is a perspective view showing a fifth step in the method for connecting the optical apparatus.
Figure 10:
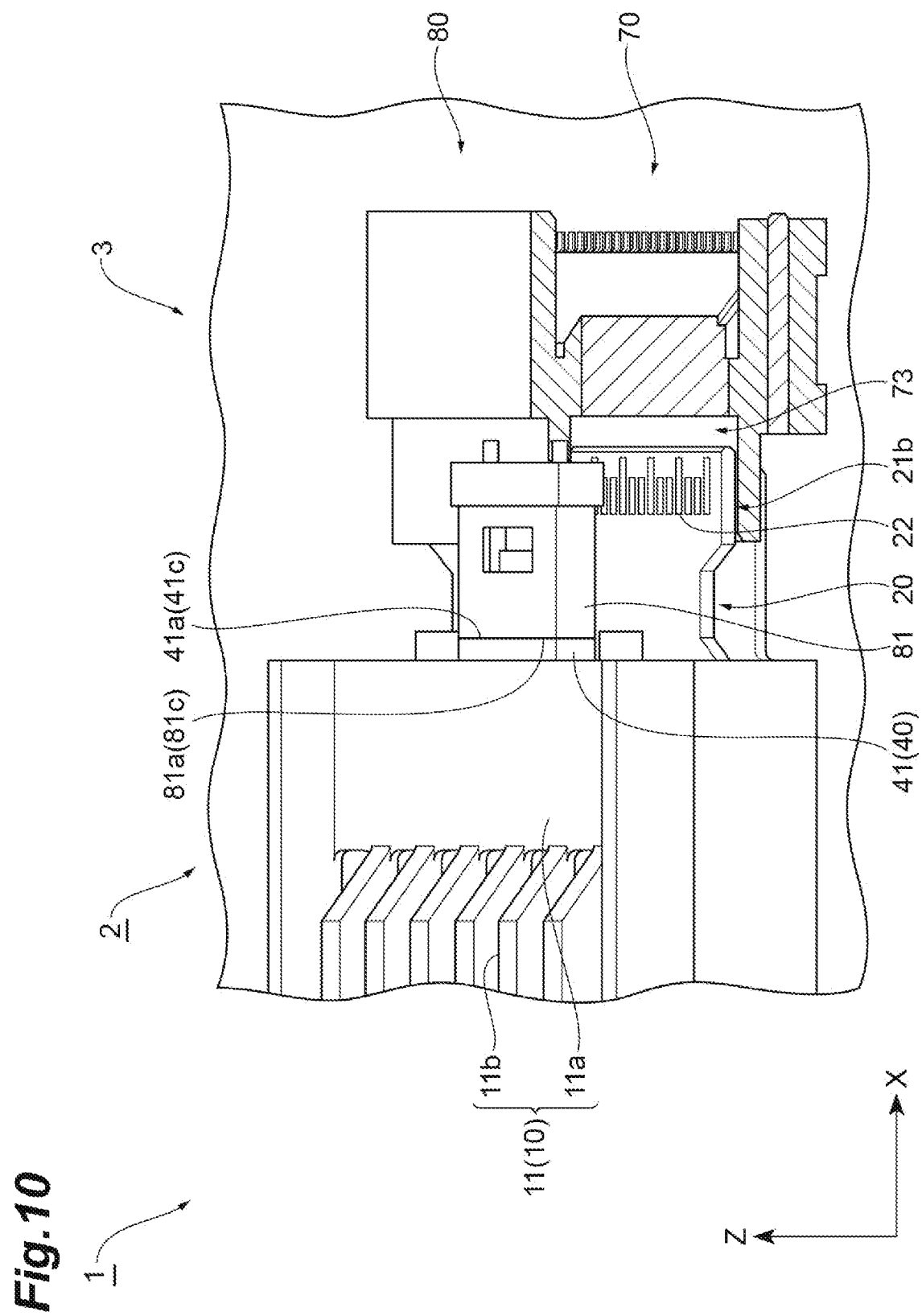
FIG. 10 is a perspective view showing the fifth step in the method for connecting the optical apparatus.

FIGS. 9 and 10 are perspective views showing a fifth step in the method for connecting the optical apparatus 1. In the fifth step, the elastic body 84 is contracted by pushing the light emitting apparatus 2 against the urging force of the elastic body 84 joined to the end surface 81*b* of the ferrule 81, and the optical interface part 81*c* is brought closer to the electrical interface part 73. Thus, the electrical interface part 21*b* further enters the electrical interface part 73, and the electrical interface part 21*b* is electrically connected to the electrical interface part 73. More specifically, the conductive pattern 22 and the conductive terminal 75 are physically brought into contact with each other. In this way, the light emitting apparatus 2 and the host apparatus 3 are connected to each other, and the connection of the optical apparatus 1 is completed.

Operation and Effect

Operations and effects of the optical apparatus 1, the light emitting apparatus 2, the optical cable 60, and the method for connecting the optical apparatus 1 described above will be described. In the optical apparatus 1, the light emitting apparatus 2 is provided with the optical interface part 41*c* of the optical connector 40 and the electrical interface part 21*b* of the electrical connector 20 at one end 10*a* of the housing 10. Then, the light emitting apparatus 2 and the host apparatus 3 are connected in a state in which the optical interface part 41*c* faces the optical interface part 81*c* of the optical connector 80 and the electrical interface part 21*b* faces the electrical interface part 73 of the electrical connector 70 at one end 10*a* of the housing 10 of the light emitting apparatus 2. Thus, both the input of the voltage (power supply voltage in the present embodiment) to the electrical interface part 21*b* and the output of the light from the optical interface part 41*c* are performed at one end 10*a* of the housing 10. Therefore, the safety against the output light is improved at the other end 10*b* of the housing 10 which faces the worker, and thereby, it is possible to reduce the measures for ensuring the safety against the output light.

Like the above-described optical apparatus 1, the optical connector 80 includes the pair of guide pins 83*a* which position the optical connector 80 with respect to the optical connector 40 when the light emitting apparatus 2 and the host apparatus 3 are connected, and the pair of guide pins 83*b* which are provided at positions at which they sandwich the pair of guide pins 83*a* and position the optical connector 80 with respect to the optical connector 40 when the light emitting apparatus 2 and the host apparatus 3 are connected. The outer diameter of the guide pin 83*b* may be larger than the outer diameter of the guide pin 83*a*, and the length L1 from the optical interface part 81*c* to the tip end of the guide pin 83*b* may be longer than the length L2 from the optical interface part 81*c* to the tip end of the guide pin 83*a*. Since the positioning is performed stepwise by the guide pins 83*a* and the guide pins 83*b* in this case, operability related to the connection between the light emitting apparatus 2 and the host apparatus 3 can be improved.

Like the optical apparatus 1 described above, the optical connector 40 includes the ferrule 41 including the optical interface part 41*c* and the holding member 42 which holds the ferrule 41. The optical connector 80 includes the ferrule 81 including the optical interface part 81*c*, and the cover member 82 which holds the ferrule 81. The guide pins 83*b* are provided on the cover member 82, and the guide pins 83*a* are provided on the ferrule 81. The pair of guide holes 43*a* into which the pair of guide pins 83*a* are respectively inserted are provided in the ferrule 41, and the pair of guide holes 43*b* into which the pair of guide pins 83*b* are respectively inserted are provided in the holding member 42 at positions at which they sandwich the pair of guide holes 43*a*. The inner diameter of the guide hole 43*b* may be larger than the inner diameter of the guide hole 43*a*. Since the holding member 42 and the cover member 82 are positioned with each other in this case, and the ferrule 41 and the ferrule 81 are positioned with each other, an alignment can be performed more precisely.

Like the above-described optical apparatus 1, the optical interface part 41*c* may protrude from the holding member 42 in the X-axis direction, and the optical interface part 81*c* may protrude from the cover member 82 in the X-axis direction. Since a connection location between the optical interface part 41*c* and the optical interface part 81*c* is not covered with the holding member 42 and the cover member 82 when the light emitting apparatus 2 and the host apparatus 3 are connected in this case, visibility of the connection location between the optical interface part 41*c* and the optical interface part 81*c* can be improved.

Like the above-described optical apparatus 1, the optical connector 80 has the elastic body 84 which applies an urging force to the ferrule 81 so that the optical interface part 81*c* protrudes in the X-axis direction with respect to the electrical interface part 73. The cover member 82 may hold the ferrule 81 via the elastic body 84, and the cover member 82 may be fixed to the electrical connector 70. Since the optical interface part 81*c* is urged so as to protrude in the X-axis direction with respect to the electrical interface part 73 in this case, the optical interface part 81*c* is connected to the optical interface part 41*c* before the electrical interface part 73 is connected to the electrical interface part 21*b*. Thus, an optical path from the optical interface part 41*c* to the optical interface part 81*c* is defined before electrical power is supplied to the light emitting device 30. Therefore, when a voltage is supplied to the electrical interface part 21*b* from the electrical interface part 73 and light is output from the light emitting device 30, the light is guided along the optical path defined in advance, and thus the safety against the light output from the optical interface part 41*c* is further improved.

According to the above-described light emitting apparatus 2, since both an input of the voltage to the electrical interface part 21*b* and an output of the light from the optical interface part 41*c* are performed at one end 10*a* of the housing 10, it is possible to reduce the measures for ensuring the safety against the output light at the other end 10*b*.

According to the above-described optical cable 60, since the output of the voltage from the electrical interface part 73 and the input of the light to the optical interface part 81*c* are performed in the vicinity of each other, it is suitable as a mating device connected to the light emitting apparatus 2 in which both the input of the voltage and the output of the light are performed at one common end 10*a*.

According to the above-described connection method, since both an electrical connection of the electrical interface part 21*b* to the electrical interface part 73 and an optical connection of the optical interface part 41c to the optical interface part 81c are performed at one end 10a of the housing 10, it is possible to reduce the measures for ensuring the safety against the transmitted light.

According to the above-described connection method, since the optical interface part 81c is connected to the optical interface part 41c before the electrical interface part 73 is connected to the electrical interface part 21b, the optical path from the optical interface part 41c to the optical interface part 81c is defined before electrical power is supplied to the light emitting device 30. Therefore, the safety against the light output from the optical interface part 41c is further improved.

The above-described embodiment describes one embodiment of the present disclosure. The optical apparatus, the light emitting apparatus, the optical cable, and the method for connecting the optical apparatus according to the present disclosure may be obtained by arbitrarily modifying each of the above-described embodiments. For example, as the light emitting apparatus, a device which transmits and receives light (for example, a transceiver or the like) may be applied instead of the light emitting apparatus 2 in the above-described embodiment.

Figure 11:
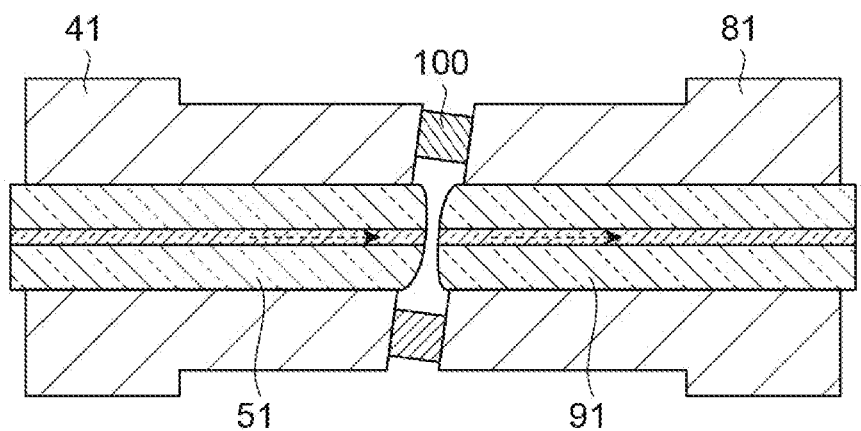
FIG. 11 is a cross-sectional view showing a modified example of an optical connection structure in the optical apparatus.

In the above-described embodiment, the configuration in which the optical connection between the ferrule 41 of the light emitting apparatus 2 and the ferrule 81 of the host apparatus 3 is a PC connection is exemplified, but the connection method is not limited thereto. For example, as shown in FIG. 11, a spacer 100 may be provided between the ferrule 41 and the ferrule 81, and the optical fiber 51 held by the ferrule 41 and the optical fiber 91 held by the ferrule 81 may be optically connected by an air gap method. Since the tip end of the optical fiber 51 and the tip end of the optical fiber 91 are not directly connected (air is interposed therebetween) in this case, dust resistance performance can be improved as compared with the PC connection. That is, according to this method, even when the dust is sandwiched between the ferrules, since it is not crushed and is not fixed, the dust can be easily removed by air blow. The spacer 100 may be a thin membrane (a film) having an opening provided around the end surface 81a of the ferrule 81 so as not to block the optical path of the optical interface part 81c. The spacer 100 may be provided on the end surface of the ferrule 41. As a method other than the air gap method, a lens method having high dust resistance may be applied to the optical connection structure between the light emitting apparatus 2 and the host apparatus 3. In this lens method, for example, lenses are disposed on the end surfaces of the optical coupling part 41d and the optical coupling part 81d, and a diameter of a beam from the optical fiber is expanded by these lenses to perform the optical coupling as collimated light. In this method, even when dust adheres, a ratio of dust hiding the optical path becomes relatively small, and thus it is possible to curb a decrease in connection loss in the optical coupling.

Although any optical fiber may be used as the optical fiber 51 constituting the optical wire 50 of the light emitting apparatus 2 and the optical fiber 91 constituting the optical wire 90 of the optical cable 60 of the host apparatus 3, a polarization-maintaining fiber (PMF) may be used. When the polarization-maintaining fiber is used for the optical fiber 51 and the optical fiber 91, it is possible to curb polarization-dependent loss at polarization crosstalk (XT) and the coupling part and to supply light without loss of optical power by performing the connection with the polarization-holding fiber of which a rotation angle is adjusted so that the polarization dependences match each other at a coupling point between the light emitting element 31 and the optical fiber 51 at one end 30a of the light emitting device 30 and a coupling point of the optical coupling part 41d and the optical coupling part 81d.

Figure 12:
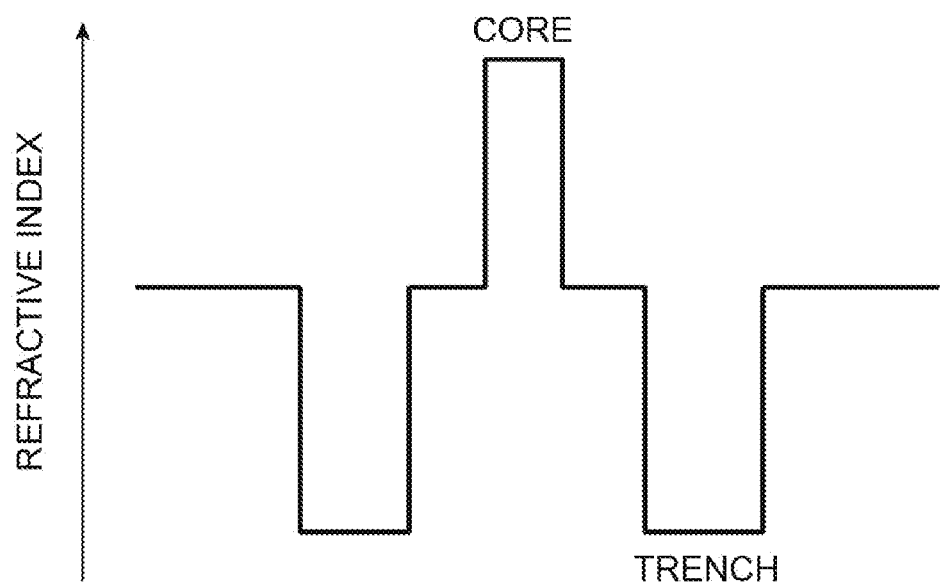
FIG. 12 is a diagram showing a refractive index in a modified example of an optical fiber used in the optical apparatus.

Since an optical wire space is limited in the light emitting apparatus 2 and the host apparatus 3, the optical fiber 51 and the optical fiber 91 may be low bending loss type optical fibers. When the optical fiber 51 and the optical fiber 91 are the above-described polarization-maintaining fibers, they may be low bending loss type polarization-maintaining fibers. In order to reduce the bending loss of the polarization-maintaining fibers, light confinement can be strengthened and the bending loss can be reduced using, for example, a trench structure (refer to FIG. 12) in which a refractive index is lowered separately from a stress imparting part.

Figure 13:
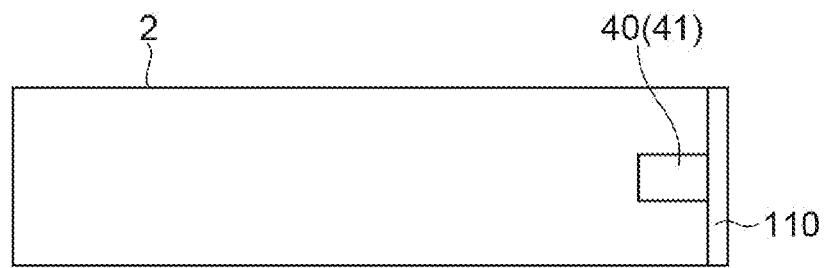
FIG. 13 is a diagram showing an example of a dust-resistant structure in the optical apparatus.
Figure 14:
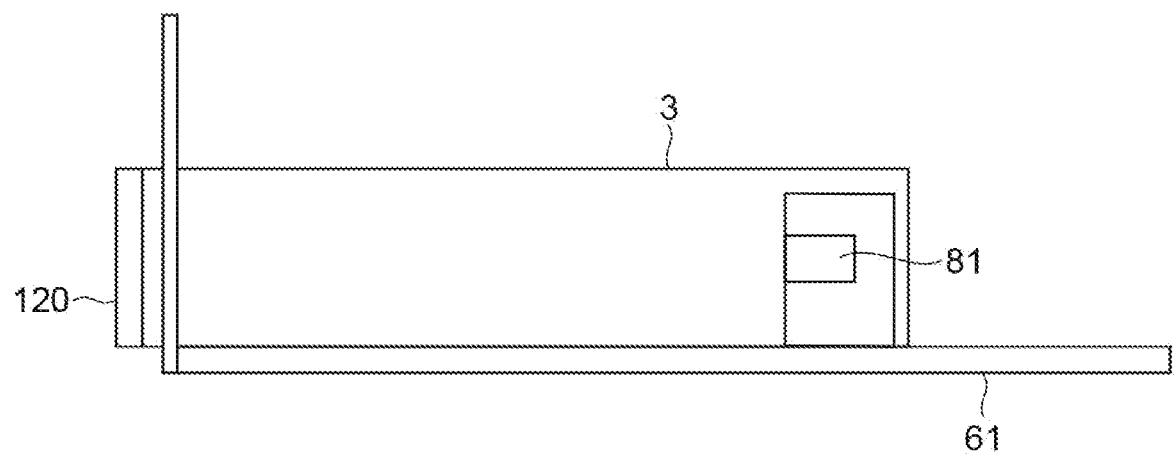
FIG. 14 is a diagram showing an example of the dust-resistant structure in the optical apparatus.
Figure 15:
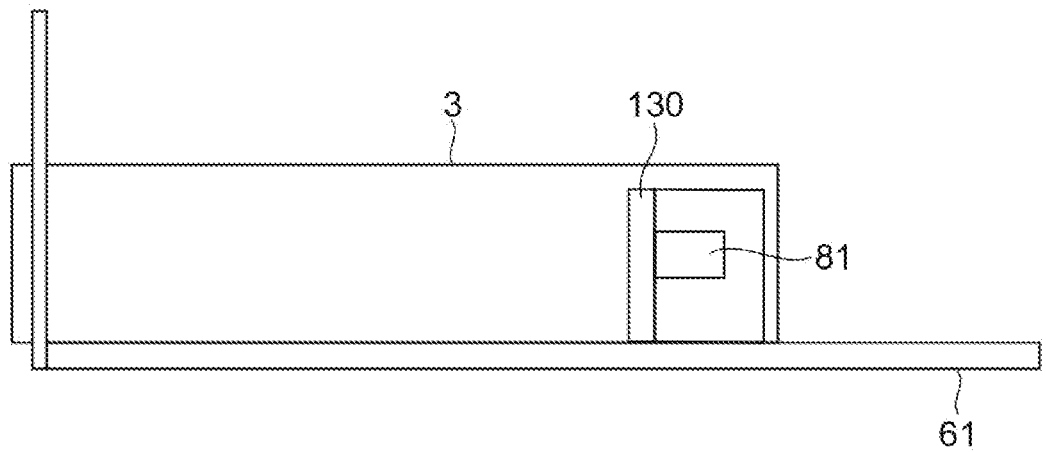
FIG. 15 is a diagram showing an example of the dust-resistant structure in the optical apparatus.

In the light emitting apparatus 2, as shown in FIG. 13, a removable cap 110 is provided on an end surface of the optical connector 40 of the light emitting apparatus 2, and the ferrule 41 or the optical interface part 41c may be covered with the cap 110 so that dust does not adhere to the ferrule 41 or the optical interface part 41c. Similarly, in the host apparatus 3, as shown in FIG. 14, a removable cap 120 may be provided at an entrance of the host apparatus 3 and the ferrule 81 or the optical interface part 81c may be covered with the cap 120 so that dust does not adhere to the ferrule 81 or the optical interface part 81c. Before the light emitting apparatus 2 is inserted into the host apparatus 3, these caps 110 and 120 may be removed and fitted together. In the host apparatus 3, as shown in FIG. 15, a dustproof cover structure 130 may be provided on the ferrule 81 of the optical connector 80 or the entire optical connector 80 so that dust does not adhere to the optical interface part 81c. Similarly, a dustproof cover may be provided on the ferrule 41 of the optical connector of the light emitting apparatus 2 or the entire optical connector.

REFERENCE SIGNS LIST

1 Optical apparatus
2 Light emitting apparatus
3 Host apparatus
10 Housing
10a One end
10b The other end
11 Upper housing
11a Flat plate
11b Heat sink
12 Lower housing
12a Side wall
12b Side wall
12c Bottom plate
13 Pull tab
20 Electrical connector
21 Printed circuit board assembly
21a Dielectric substrate
21b Electrical interface part (first electrical connection part)
21c Device connection part
21d Main surface
21e Back surface
22 Conductive pattern
23 Conductive terminal
30 Light emitting device
30a One end
30b The other end
31 Light emitting element 40 Optical connector
41 Ferrule (first optical connection member)
41a End surface
41b End surface
41c Optical interface part (first optical connection part)
41d Optical coupling part
42 Holding member (first holding member)
42a Bottom plate
42b Side wall
42d Holding groove
43 Guide hole
43a Guide hole (first guide hole)
43b Guide hole (second guide hole)
50 Optical wire
51 Optical fiber (second optical fiber)
60 Optical cable
61 Printed circuit board assembly (host board)
61a Mounting surface
70 Electrical connector (host electrical connector)
71 Base part
71a Bottom surface
71b Top surface
71c One end
71d The other end
72 Board connection part (third electrical connection part)
73 Electrical interface part (second electrical connection part)
74 Conductive terminal
75 Conductive terminal
80 Optical connector (host optical connector)
80a One end
81 Ferrule (second optical connection member)
81a End surface
81b End surface
81c Optical interface part (second optical connection part)
81d Optical coupling part
82 Cover member (second holding member)
83 Guide pin
83a Guide pin (first guide pin)
83b Guide pin (second guide pin)
84 Elastic body
90 Optical wire
91 Optical fiber (first optical fiber)
100 Spacer
110 Cap
120 Cap
130 Dustproof cover structure
S Accommodation space

The invention claimed is:

1. An optical apparatus comprising:
a light emitting apparatus including
    a housing extending in a first direction,
    a light emitting device mounted in the housing,
    an optical connector including a first optical connection part provided at one end of the housing, the optical connector being optically coupled to the light emitting device, and
    an electrical connector including a first electrical connection part provided at one end of the housing, wherein the first electrical connection part is configured to receive a voltage to drive the light emitting device; and
a host apparatus including
    a host optical connector including a second optical connection part configured to face the first optical connection part and be optically coupled to the first optical connection part when the light emitting apparatus is connected to the host apparatus,
    a host electrical connector including a second electrical connection part configured to face the first electrical connection part in a state in which the first optical connection part and the second optical connection part face each other and be electrically connected to the first electrical connection part, and
    a host board that mounts the host optical connector and the host electrical connector thereon,
wherein the light emitting apparatus and the host apparatus are configured to be connected to each other in a same axis direction.

2. The optical apparatus according to claim 1,
wherein the host optical connector further includes
a pair of first guide pins configured to position the host optical connector with respect to the optical connector when the light emitting apparatus is connected to the host apparatus, and
a pair of second guide pins provided at positions at which the pair of first guide pins are sandwiched therebetween, the pair of second guide pins being configured to position the host optical connector with respect to the optical connector when the light emitting apparatus is connected to the host apparatus, and
wherein the outer diameter of each of the second guide pins is larger than the outer diameter of each of the first guide pins, and the length from the second optical connection part to the tip end of the second guide pin is longer than the length from the second optical connection part to the tip end of the first guide pin.

3. The optical apparatus according to claim 2,
wherein the optical connector further includes
a first optical connection member including the first optical connection part, and
a first holding member that holds the first optical connection member,
wherein the host optical connector further includes
a second optical connection member including the second optical connection part, and
a second holding member that holds the second optical connection member,
wherein the first guide pins are provided on the second optical connection member, and the second guide pins are provided on the second holding member, and
wherein a pair of first guide holes into which the pair of first guide pins are inserted are provided in the first optical connection member, and a pair of second guide holes into which the pair of second guide pins are inserted are provided in the first holding member at positions at which the pair of first guide holes are sandwiched therebetween, and the inner diameter of each of the second guide holes is larger than the inner diameter of each of the first guide holes.

4. The optical apparatus according to claim 3, wherein the first optical connection part protrudes from the first holding member in the first direction, and the second optical connection part protrudes from the second holding member in the first direction.

5. The optical apparatus according to claim 3, wherein the second optical connection member is removable from the host optical connector in the first direction.

6. The optical apparatus according to claim 3,
wherein the host optical connector further includes an elastic body configured to exert a force to the second optical connection member so that the second optical connection part protrudes further in the first direction than the second electrical connection part, and wherein the second holding member holds the second optical connection member via the elastic body, and the host electrical connector is fixed to the second holding member.

7. The optical apparatus according to claim 6, wherein the second optical connection member is held by the elastic body with a force of 3N or more to protrude from the second electrical connection part in the first direction while the second optical connection member is inserted into the host optical connector, wherein when the second optical connection member is removed from the host optical connector, at least the second optical connection member and the elastic body are integrally removed, and wherein the elastic body has a structure in which the elastic body is mountable on and removable from the second optical connection member and a first optical fiber held by the second optical connection member in a state in which the elastic body is removed from the host optical connector.

8. The optical apparatus according to claim 1, wherein the host apparatus further includes a first optical fiber attached to the host optical connector and optically coupled to the second optical connection part, and a wire connected to the second electrical connection part and provided on the host board, and wherein the host electrical connector is fixed to the host optical connector.

9. The optical apparatus according to claim 1, wherein the light emitting apparatus further includes a plurality of second optical fibers optically coupled to the light emitting device and the first optical connection part, and the first optical connection part is configured of a plurality of optical coupling parts arranged in a second direction intersecting the first direction and optically coupled to the plurality of second optical fibers, respectively.

10. A method for connecting a light emitting apparatus to a host apparatus, the method comprising:

preparing the light emitting apparatus including a housing extending in a first direction, a light emitting device mounted in the housing, and an optical connector including a first optical connection part provided at one end of the housing, the optical connector being optically coupled to the light emitting device, and an electrical connector including a flat plate-shaped first electrical connection part provided at one end of the housing, the electrical connector being configured to receive a voltage to drive the light emitting device;

preparing the host apparatus including a host optical connector including a second optical connection part configured to face the first optical connection part, a host electrical connector including a concave second electrical connection part configured to face the first electrical connection part and make the first electrical connection part enter therein, and a host board that mounts the host optical connector and the host electrical connector thereon;

inserting, in a same axis direction, a plurality of guide pins provided on the host optical connector into a plurality of guide holes provided in the optical connector;

causing the first electrical connection part to enter the second electrical connection part in the same axis direction;

optically coupling the first optical connection part to the second optical connection part in the same axis direction; and electrically connecting the first electrical connection part to the second electrical connection part in the same axis direction.

* * * * *